Fig. 1.

Nov. 1, 1949  S. W. E. ANDERSSON  2,486,908
AIR CONDITIONING
Filed Feb. 5, 1946  3 Sheets-Sheet 2

INVENTOR.
Sven W. E. Andersson
BY
Oliver S. Titcomb
his ATTORNEY

Nov. 1, 1949 S. W. E. ANDERSSON 2,486,908
AIR CONDITIONING
Filed Feb. 5, 1946 3 Sheets-Sheet 3

INVENTOR.
Sven W. E. Andersson
BY
Oliver S. Titcomb
his ATTORNEY

Patented Nov. 1, 1949

2,486,908

UNITED STATES PATENT OFFICE 2,486,908

AIR CONDITIONING

Sven W. E. Andersson, Evansville, Ind., assignor to Servel, Inc., New York, N. Y., a corporation of Delaware Application February 5, 1946, Serial No. 645,552

15 Claims. (Cl. 257—3)

The present invention relates to air conditioning and more particularly to cooling and dehumidifying the air in an enclosure to be conditioned.

While the present invention is applicable to other air conditioning units, it is particularly adapted for use with and constitutes an improvement in the air conditioning unit and controls illustrated and described in my prior copending application for U. S. Letters Patent Serial No. 636,977, filed December 22, 1945, Patent No. 2,469,142 of May 3, 1949, entitled Air conditioning. The air conditioning unit illustrated in my prior application comprises a heat operated refrigeration system, a heating system, a source of heating medium and a selective diverter valve for directing heating medium from the source to operate either the refrigeration system or the heating system, respectively. When the refrigeration system is in operation it cools the air to reduce its temperature and dehumidifies the air by cooling it below its dew point. A thermostat responsive to the ambient in the enclosure to be conditioned controls the operation of the refrigeration system so that the air is dehumidified only when the temperature in the enclosure is above the thermostat setting. However, in certain localities it is desirable to dehumidify the air when the temperature in the enclosure is at or below the temperature at which the thermostat initiates operation of the refrigeration system.

One of the objects of the present invention is to provide a humidity responsive control for initiating operation of the refrigeration system to dehumidify the air in an enclosure when the room thermostat is satisfied.

Another object is to dehumidify the air when it is at or below the desired temperature by cooling it below its dew point and then reheating the cooled air to maintain a comfortable temperature in the enclosure.

Another object is to simultaneously supply heat from a common source to the refrigeration and heating systems to dehumidify the air by cooling it below its dew point and reheat the dehumidified air.

Another object is to provide an electric control for an air conditioning unit having a temperature responsive circuit for initiating operation of the refrigeration system to cool the air and a humidity responsive circuit for initiating operation of the refrigeration and heating systems simultaneously to dehumidify and reheat the air.

Another object is to provide a control of the type indicated in which the temperature responsive circuit overrules the humidity responsive circuit to discontinue reheating when the temperature increases in the enclosure to be conditioned.

Still another object of the present invention is to provide a control of the type indicated having a relay operated by energization of the humidity responsive circuit for initiating operation of the refrigeration and heating systems to dehumidify and reheat the air to be conditioned and a relay operated by energization of the temperature responsive circuit for opening the humidity responsive circuit.

These and other objects will become more apparent from the following description and drawings in which like reference characters denote like parts throughout the several views. It is to be expressly understood, however, that the drawings are for the purpose of illustration only and not a definition of the limits of the invention, reference being had for this purpose to the appended claims.

Figure 1:
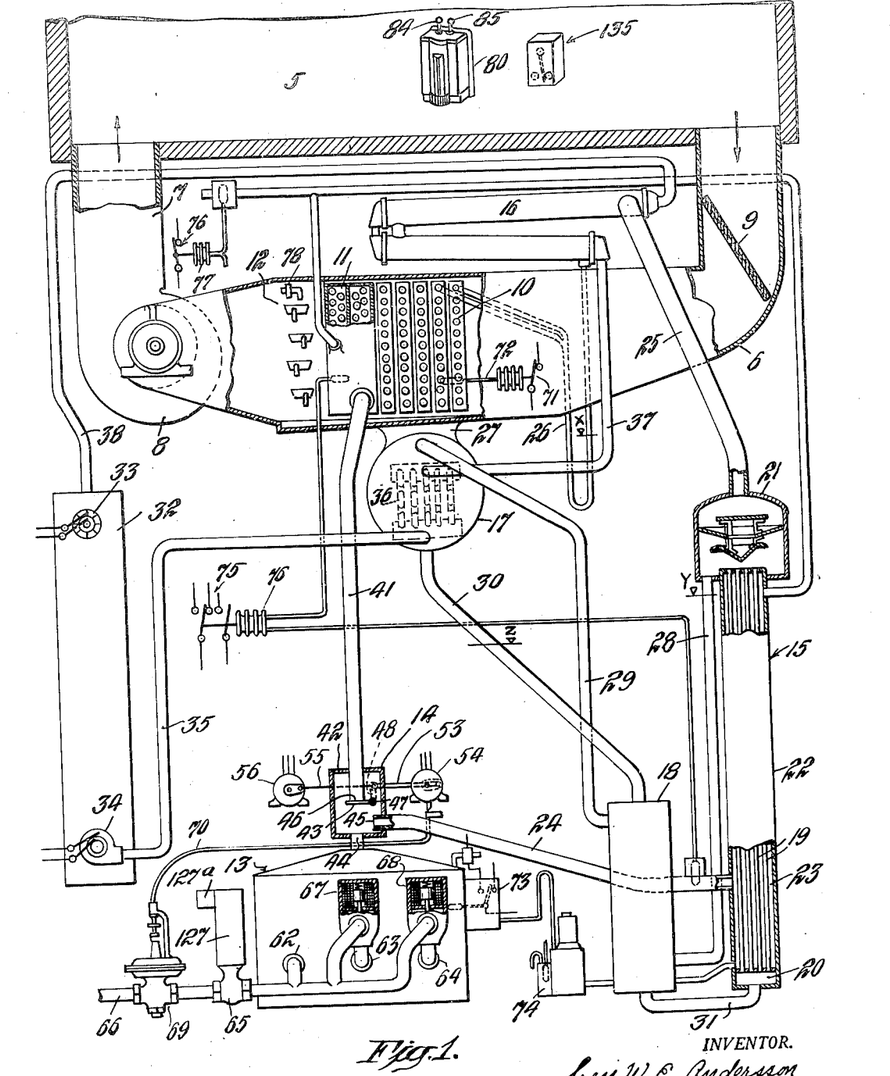
Fig. 1 is a diagrammatic view of an air conditioning unit to which the present invention may be applied.

Referring to the drawings, Fig. 1 illustrates an enclosure 5 to be conditioned and an air conditioning unit comprising a conduit 6 for receiving air from the enclosure and a conduit 7 for delivering air to the enclosure. The air to be conditioned is circulated through the conduits 6 and 7 in the direction indicated by the arrows by means of an electric motor operated blower 8. As the air flows through the conduit 6 it is conditioned by elements mounted therein comprising a filter 9, a cooling element 10, a heating element 11, and a humidifier 12. The cooling element 10 constitutes the evaporator of a heat operated absorption refrigeration system while the heating element 11 constitutes the radiator of a steam heating system. Both the refrigeration system and the heating system are selectively supplied with steam from a boiler 13 constituting a single source of heat; and the supplying of heating steam to the selected system is controlled by a diverter valve 14.

The heat operated refrigeration system is preferably of the type illustrated and described in the United States Letters Patent No. 2,282,503 of Albert R. Thomas, issued May 12, 1942, entitled Refrigeration. Such an absorption refrigeration system operates in a partial vacuum and utilizes water as a refrigerant and a salt solution as an absorbent. Suffice it to state herein that the refrigeration system comprises a generator 15, a condenser 16, evaporator 10, absorber 17 and heat exchanger 18 interconnected to provide a closed circuit. The generator 15 has a series of upright tubes 19 connected at their lower ends to an inlet chamber 20 for absorption solution and connected at their upper ends to a separating chamber 21. Surrounding the tubes 19 is a shell 22 providing a heating chamber 23 therebetween.

Steam is supplied to the heating chamber 23 from the boiler 13 through the diverter valve 14 and a conduit 24 and heat is transferred from the steam through the tubes 19 to the absorption solution therein to expel refrigerant vapor therefrom. The refrigerant vapor rises upwardly through the tubes 19 at considerable velocity and raises the absorption solution at the sides of the tubes by a climbing film action. The refrigerant vapor flows from the separating chamber 21 to the condenser 16 through a conduit 25 and liquefied refrigerant flows from the condenser through a U-shaped conduit 26 to the evaporator or cooling element 10. Refrigerant vapor flows from the evaporator 10 to the absorber 17 through passages or headers 27.

Absorption solution weak in refrigerant or, in other words, a concentrated salt solution flows by gravity from the separating chamber 21 to the top of the absorber 17 in a path of flow including the conduit 28, heat exchanger 18 and conduit 29. The solution in the absorber 17 absorbs the refrigerant vapor and this solution strong in refrigerant or, in other words, dilute salt solution flows by gravity from the bottom of the absorber 17 to the inlet chamber 20 at the bottom of the generator 15 in a path of flow including the conduit 30, heat exchanger 18, and conduit 31. The absorption of refrigerant vapor in the absorber 17 maintains a relatively low pressure and temperature in the evaporator 10 to produce a refrigerating effect and the low pressure in the evaporator and absorber is maintained by liquid columns in the conduits 26, 29 and 30.

The absorber 17 and condenser 16 are cooled by cooling water from any suitable source such as the cooling tower 32 illustrated in Fig. 1 of the drawings. The cooling tower 32 may be of any suitable construction and, as shown, has an electric motor driven fan 33 adjacent its upper end to produce a flow of air upwardly therethrough and an electric motor driven pump 34 at the bottom of the tower to circulate cooling water through the absorber 17 and condenser 16 of the refrigeration system. The path of flow for the cooling water includes the conduit 35, cooling coils 36 in the absorber, conduit 37, condenser 16, and conduit 38, back to the top of the cooling tower.

The heating system comprises the radiator 11 and a conduit 41 connecting the radiator to the diverter valve 14 and boiler 13.

Steam is supplied to either the refrigeration system or heating system by the diverter valve 14 illustrated diagrammatically in Fig. 1 as comprising a valve body in the form of a steam box or chamber 42 mounted on the boiler 13 and a valve element 43. Preferably the diverter valve 14 is of the construction illustrated in Figs. 3 and 4 comprising the valve body 42 having a steam inlet port 44 connected to the boiler 13, an outlet port 45 for connection with the conduit 24 for supplying steam to the generator 15 and a port 46 for connection with the conduit 41 for supplying steam to the radiator 11. The valve element 43 is mounted on an arm 47a and the arm is fast on a rock shaft 47 journaled in suitable bearings in the valve body 42. A crank arm 48 is mounted on the end of the shaft 47 at the outside of the valve body for rocking the shaft 47 to engage the valve element 43 with either one or the other of the valve ports 45 and 46. A spring 49 yieldingly maintains collars on the shaft 47 in engagement with bearing faces on the valve body to seal the joints and the collar on the end of the shaft opposite the spring has an offset crank arm 50. An over center spring 51 is connected between the crank arm 50 and an abutment 52 on the valve body to yieldingly hold the valve element 43 in engagement with the respective ports 45 or 46.

Figure 2:
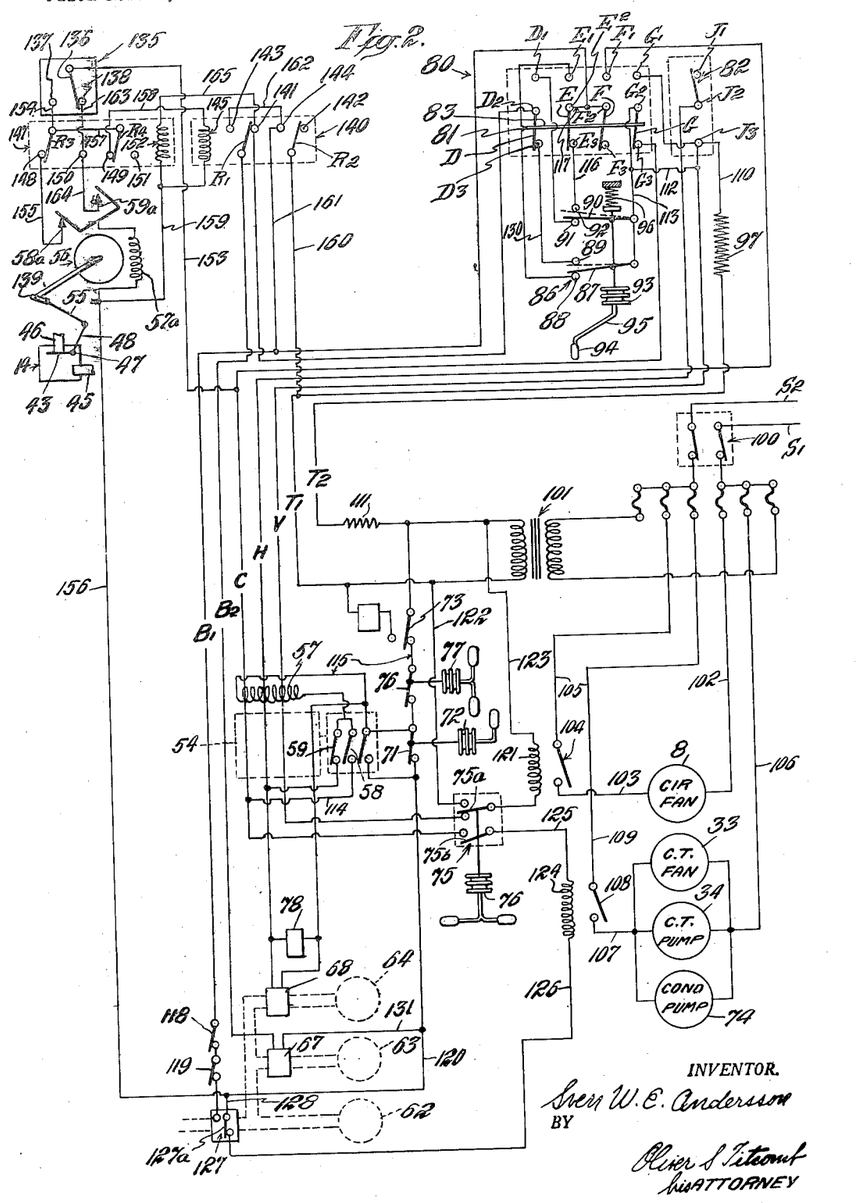
Fig. 2 is a wiring diagram of the electric control system for the air conditioning unit illustrated in Fig. 1 and incorporating the dehumidifying and reheat control of the present invention.
Figures 3, 4, 5:
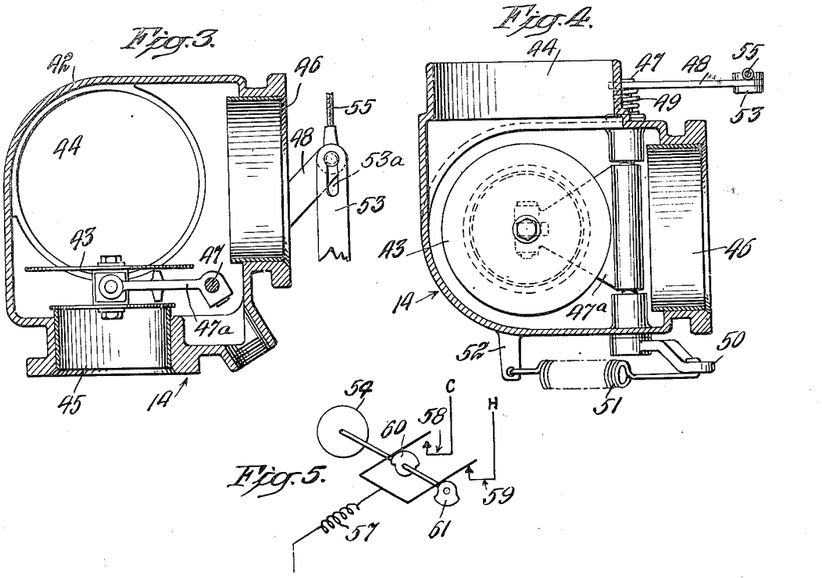
Fig. 3 is a sectional view of a preferred form of selective diverter valve used to direct heating medium to the refrigeration and heating systems, respectively.
Fig. 4 is a sectional plan view of the diverter valve illustrated in Fig. 3 and showing the mechanism for shifting the valve and partially opening the valve to simultaneously dehumidify and reheat the air.
Fig. 5 is a diagrammatic view illustrating the winding of the motor for shifting the diverter valve and the limit switches for controlling the operation of the motor.

As illustrated in Fig. 1, a rigid link having a slotted end 53a, see Fig. 3, connects the crank arm 48 to the crank arm of an electric motor 54 operative in successive cycles of 180° of movement to alternately rock the valve element 43 through 90° to engage valve seats 45 and 46 respectively. A flexible wire link 55 connects the crank arm 48 to the crank arm of a second or reheat motor 56 for moving the valve element 43 away from the valve port 46 a predetermined distance as later described in detail. The motor 54 has a field winding 57 and a pair of limit switches 58 and 59 as illustrated in Fig. 5. The limit switches 58 and 59 may be operated by cams 60 and 61 on the motor shaft for alternately opening one switch and closing the other switch after each 180° of movement to stop the motor and set the circuit for the next cycle of operation. The motor 56 also has a field winding and limit switches like the motor 54 and are indicated by the reference characters 57a, 58a and 59a in Figs. 2, 6 and 7.

The boiler 13 may be heated by any suitable type of fluid fuel burners such as the plurality of gas burners 62, 63 and 64 illustrated in Fig. 1. The flow of fuel to the burners 62, 63 and 64 is controlled by a master valve 65 in the fuel supply line 66 and operated by an electric motor 127 and by individual magnetically operated control valves 67 and 68 for the burners 63 and 64. As more heat may be required by the heating system to heat the air than is required by the refrigeration system to cool the air, a gas pressure regulator 69 may be provided in the fuel supply line 66. The gas pressure regulator 69 is adjusted by the motor 54 through a Bowden wire 70.

The air conditioning unit also includes a low temperature cut-out switch 71 having a thermostat 72 subjected to the temperature in the evaporator 10; a low water cut-out unit 73 for maintaining water in the boiler 13; a condensate return pump 74 for delivering condensate from the generator heating chamber 23 to the boiler 13; a delayed action control switch 75 operated by a thermostat 76 responsive to the temperature in the heating element 11 and heating chamber 23 of the generator 15; a vent switch 76 operated by a thermostat 77 when steam escapes from either the generator 15 or heating element 11 or when condensate overflows from the sump of the condensate return pump 74; and a magnetically operated water valve 78 for supplying water to the humidifier 12.

The control system for the air conditioning unit including the various operating elements previously described is illustrated diagrammatically in Fig. 2 and includes a selective controller 80 in the enclosure 5 and a plurality of electric circuits. The controller 80 comprises a switch box having a four-pole double-throw switch 81 and a single-pole double-throw switch 82. The four poles of the switch 81 are indicated by the reference characters, D, E, F and G, and the three contacts for each pole are indicated by the reference character for the pole and the subscript 1, 2 and 3, such as, $D_1$, $D_2$, and $D_3$, etc. The four poles are mechanically connected by a bar 83, see Fig. 2, for simultaneous operation by a manually operable lever 84, see Fig. 1. When the four pole switch 81 is moved to the upper position to engage poles D, E, F and G with fixed contacts $D_1$, $E_1$, $F_1$ and $G_1$, it connects certain of the branch circuits to render the heating system operative; when in the lower position illustrated in Fig. 2 it connects certain of the branch circuits to render the refrigeration system operative; and when moved to an intermediate position it disconnects all of the branch circuits to render both the heating and cooling system inoperative.

Switch 82 has a pole J and fixed contacts $J_1$, $J_2$ and $J_3$, and the pole J is adapted to be operated manually to two positions by a lever 85, see Fig. 1. When the pole J of the switch 82 is in the upper or off position illustrated in Fig. 2 the blower 8 is adapted for joint operation with the selected heating or refrigeration system and when moved to its lower position into engagement with the fixed contact $J_3$ it connects the blower for continuous operation independently of the switch 81.

Also mounted in the switch box of the controller 80 is a thermostatically operated switch means 86, illustrated diagrammatically in Fig. 2 as comprising a pair of switches arranged to be actuated in sequential order in two directions of movement. One of the switches has a movable contact 87 and a pair of fixed contacts 88 and 89 at opposite sides thereof and the other switch has a movable contact 90 and a pair of fixed contacts 91 and 92 positioned at its opposite sides. The movable contacts 87 and 90 are adapted to be moved in sequential order by a single thermostat comprising an expansible bellows 93, a bulb 94 outside of the switch box subjected to the ambient temperature in the enclosure 5 and a capillary tube 95 connecting the bulb and bellows. The bulb 94 contains a volatile liquid which produces a vapor pressure corresponding to the temperature of the ambient to expand the bellows 93. The switches are so arranged with respect to each other that the bellows 93 first actuates the movable contact 90 into engagement with the fixed contact 92 upon a predetermined rise in temperature and thereafter actuates the movable contact 87 into engagement with the fixed contact 89 upon a further predetermined rise in temperature. A spring 96 actuates the movable contacts 87 and 90 successively into engagement with the fixed contacts 88 and 91 upon a fall in the temperature of the ambient. To make the bulb 94 of the thermostat the coldest and therefore the sensitive part to changes in ambient temperature a heater is provided in the switch box comprising an electric resistance element 97.

The electric control system includes line voltage circuits for energizing the motors for the blower 8, cooling tower fan 33 and pump 34 and condensate return pump 74, and low voltage circuits for controlling all other elements of air conditioning unit. Electric current is supplied to the control system from the service mains, $S_1$, $S_2$, through a line switch 100 to the primary winding of a step-down transformer 101. The circuit for the blower 8 is connected across the service mains $S_1$ and $S_2$ in parallel with the primary winding of the transformer 101 and comprises the conductor 102 connecting the line $S_1$ to one side of the blower motor, a conductor 103 connecting the other side of the blower motor to a relay switch 104 and a conductor 105 connecting relay switch to the other service line $S_2$. The motors for the cooling tower fan 33, cooling tower pump 34, and condensate return pump 74 are connected in parallel for simultaneous operation and the circuit therefor comprises a conductor 106 connecting the service line $S_1$ to one side of the motors, a conductor 107 connecting the other sides of the motors to a relay switch 108 and a conductor 109 connecting the relay switch to the service line $S_2$. As illustrated, all of the line voltage circuits are protected by suitable fuses.

The resistance element 97 for heating the interior of the control box 80 is connected across the secondary terminals of the step-down transformer 101 by an electric circuit comprising a conductor $T_1$ connecting one terminal of the transformer to the fixed contact $J_3$ of the switch 82, a conductor 110 connecting $J_3$ to one side of the resistance element and a conductor $T_2$ connecting the other side of the resistance 97 to the other terminal of the transformer secondary. Preferably a second resistance 111 is provided in the conductor $T_2$ to adjust the amount of heat produced by the heating element 97.

The control system also includes a first branch circuit H in parallel with the circuit for the heating resistance 97 for initiating operation of the heating system when selector switch 81 is in its upper position; a second branch circuit C in parallel with the circuit for the resistance element 97 to initiate operation of the refrigeration system when selector switch 81 is in the position illustrated in Fig. 2; and a plurality of tertiary circuits $B_1$ and $B_2$ to control the rate of operation of the selected system. As the control of the air conditioning unit during winter operation to heat the enclosure forms no part of the present invention, a detailed description of the circuit is omitted. Suffice it to state that when the selector switch 81 is moved to its upper position as viewed in Fig. 2 to engage the poles D, E, F and G with the fixed contacts $D_1$, $E_1$, $F_1$ and $G_1$, the thermostatic switch means 86 energizes and de-energizes branch circuits H, $B_1$ and $B_2$ to start and stop operation of the boiler 13 with a step control to supply heating steam to the radiator 11 in accordance with the temperature of the ambient in the enclosure 5 and also supply water to the humidifier 12.

When the selector switch 81 is moved to its lower position for summer operation as illustrated in Fig. 2, the branch circuit C will be immediately energized. The branch circuit C comprises the conductors $T_1$, 112 and 113, and pole G of selector switch 81 to conductor C. The circuit is first completed through conductor 114, limit switch 58, field winding 57 of motor 54 and conductor 115 including the vent switch 76 and low water cutout switch 73 to $T_2$. Upon energization of the motor winding 57, the motor 54 rotates 180° to shift the diverter valve 14 to the position illustrated in Fig. 1 so that steam formed in the boiler 13 will flow to the generator 15 of the refrigeration system.

Upon a rise in temperature in the enclosure 5 the branch circuit $B_1$ will be energized to initiate operation of the refrigeration system at half capacity. The branch circuit $B_1$ comprises the conductors $T_1$, 112 and 113, contacts 90 and 92 of thermostatic switch means 86, conductor 116, pole E of switch 81, and jumper 117 to conductor $B_1$. The branch circuit $B_1$ is completed through the safety switches 118 and 119 operated by the pilot flames for the gas burners 62, 63 and 64, the motor 127 for the master fuel valve 65 and conductors 128, 120 and 115 to $T_2$. Energization of branch circuit $B_1$ opens the master fuel valve 65 and thereby initiates operation of the burner 62 to heat the boiler 13 and generate steam.

After the master fuel valve 65 has opened and the boiler 13 has been heated by the burner 62 for a sufficient period of time to generate and supply steam to the heating chamber 23 of the generator 15, the thermostat 76 will operate the delayed action control switch 75 to initiate operation of the blower 8. The circuit for the blower is completed through the conductor 122 connecting $T_1$ to the upper movable contact 75a of the delayed action control switch 75, relay coil 121, and conductor 123 to $T_2$. Energization of the relay coil 121 closes the relay switch 104 to cause operation of the blower 8 when operation of the refrigeration system is initiated by supplying heat to the generator 15.

When steam is supplied to the heating chamber 23 of the generator 15 the delayed action switch 75 also operates to complete a circuit through the relay coil 124 for initiating operation of the cooling tower fan 33, cooling tower pump 34 and condensate return pump 74. The circuit for the relay coil 124 comprises a continuation of the conductor C through the lower contact 75b of delayed action control switch 75, conductor 125 to one side of the relay coil 124, conductor 126 to a switch 127a on the motor 127 for the master fuel valve 65 and from the switch through the conductors 120 and 115 to $T_2$. The switch 127a is closed by the motor 127 when the master fuel valve 65 is open and opened when the master fuel valve 65 is closed. Upon energization of the relay coil 124 the relay switch 108 is closed. The circuit for the cooling tower fan 33, cooling tower pump 34 and condensate return pump 74 is completed from the supply main $S_1$, conductor 106 to one side of the motors, conductor 107, relay switch 108 and conductor 109 to the supply main $S_2$. Thus, closing of the relay switch 108 initiates operation of the cooling tower 32 and the condensate return pump 74.

Upon a further rise in temperature the branch circuit $B_2$ is energized to increase the rate of operation of the refrigeration system to maximum capacity. The branch circuit $B_2$ comprises the conductors $T_1$, 112 and 113, contacts 87 and 89 of the thermostatic switch means 86, conductor 130 to contact $D_3$, and pole D to conductor $B_2$. The conductor $B_2$ includes the pole $R_1$ and fixed contact 141 of a relay switch 140, later described in detail. The branch circuit $B_2$ is completed through the solenoid valve 67 for fuel burner 63 and conductors 131, 120 and 115 to $T_2$.

Upon a decrease in the temperature of the ambient in the enclosure 5, the spring 96 will operate the movable contacts 87 and 90 of the switch means 86, successively, to first deenergize branch circuit $B_2$ to decrease the rate of operation to half capacity and thereafter open branch circuit $B_1$ to discontinue operation of the refrigeration system. As thus far described the air conditioning system and control therefor, except for the reheat motor 56, is substantially identical with that described in my prior co-pending application previously referred to.

In accordance with the present invention a humidity responsive circuit is provided for simultaneously initiating operation of the refrigeration and heating systems when the room thermostat 93, 94, 95 is satisfied or the refrigeration system is operating on one burner 62 to dehumidify the air in the enclosure 5 by cooling it below its dew point and reheat the relatively cold dehumidified air. The humidity responsive circuit is connected in parallel with the temperature responsive circuit and includes a humidistat 135 in the enclosure 5 and the reheat motor 56, see Figs. 1 and 2. The humidistat 135 may be of any suitable type which operates in response to changes in the moisture content or relative humidity of the air to be conditioned. As illustrated diagrammatically in Fig. 2 the humidistat 135 has movable contact 136 engageable with a fixed contact 137 when the humidity is high and engageable with a fixed contact 138 when the humidity is within permissible limits. Preferably, the humidistat 135 is of a type which operates with a snap action to one or the other of its two positions.

The reheat motor 56 is of the type illustrated in Fig. 5 having a field winding 57a and limit switches 58a and 59a operated alternately after each 180° of movement to open one switch to stop the motor and close the other switch to set the circuit for the next cycle of operation, as previously described with respect to the motor 54. The reheat motor 56 has a crank arm 139, see Fig. 2, connected to the crank arm 48 of the diverter valve 43 by a flexible connecting link 55, as previously explained, but the eccentricity of the motor crank arm 139 is such as to move the rock shaft 47 and diverter valve 43 through a small arc to uncover port 46. Thus, the reheat motor 56 is operable during movement in one direction to exert a pull on the crank arm 48 of the diverter valve 42 against the action of the over center spring 51 to move the valve element 43 to the position illustrated in Fig. 6 and thereby uncover the port 46 to permit a portion of the steam from the boiler 13 to flow to the heating radiator 11, the slot 53a in the link 53 permitting such relative movement. Upon movement of the reheat motor 56 through another 180° the over center spring 51 will move the valve element 43 back to the position illustrated in Fig 2 to close the port 46. When the motor 54 operates to shift the valve element 90° from a cooling to a heating position the flexible link 55 will yield to permit relative movement.

Figure 6:
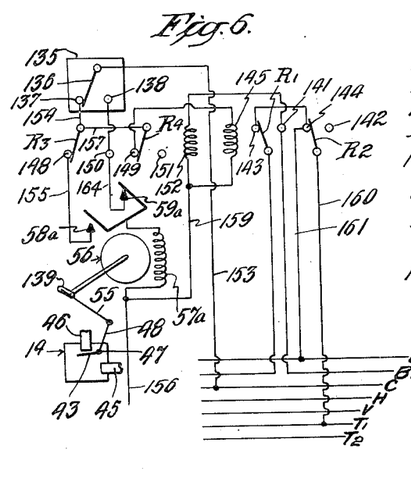
Fig. 6 is a diagrammatic view of the dehumidifying and reheat control circuits illustrated in Fig. 2 and showing the position of the relays to partially open the diverter valve to supply heat simultaneously to the refrigeration and heating systems.

The humidity responsive circuit also includes a relay 140 operable to one or the other of its two positions upon movement of the movable contact 136 of the humidistat 135 from contact 138 to contact 137 and vice versa. Relay 140 comprises movable poles $R_1$ and $R_2$ engageable with the fixed contacts 141 and 142 in one position to deenergize the branch circuits $B_1$ and $B_2$ and engageable with the fixed contacts 143 and 144, see Fig. 6, to energize the branch circuits $B_1$ and $B_2$ when the thermostatic switch 86 in the room is satisfied. The poles $R_1$ and $R_2$ are normally urged into engagement with the contacts 141 and 142 and are moved by a relay coil 145 into engagement with the contacts 143 and 144 as illustrated in Fig. 6.

A relay 147 is also provided for completing the circuit to the reheat motor 56 when the contact 136 of the humidistat 135 moves into engagement with contact 137 and for opening the humidity responsive circuit when the temperature responsive circuit is energized. The relay 147 comprises the poles $R_3$ and $R_4$ normally urged into engagement with the fixed contacts 148 and 149 and movable into engagement with the contacts 150 and 151 by a relay coil 152.

To more clearly set out the invention, the description of the humidity responsive circuit is combined with its mode of operation.

As illustrated in Fig 2 the movable contact 136 of the humidistat 135 is energized by a conductor 153 tapped from the conductor C which, in turn, is connected to the secondary of the transformer 101 through the pole G of the selector switch 81 and conductors 113, 112 and $T_1$. When the movable contact 136 of the humidistat 135 moves into engagement with the fixed contact 137 upon an increase in the relative humidity, a circuit is completed through the conductor 154, pole $R_3$ and contact 148 of relay 147, conductor 155, limit switch 58a, field winding 57a of the motor 56 and conductors 156, 120 and 115 to $T_2$. Energization of the reheat motor 56 will cause operation through 180° of movement from the position illustrated in Fig. 2 to that illustrated in Fig. 6 to partially open the valve element 43, open the limit switch 58a and close the limit switch 59a.

Simultaneously a relay circuit is energized to operate the relay 140 and energize the branch circuits $B_1$ and $B_2$ to initiate operation of the refrigeration system. The relay circuit comprises a jumper 157 between the poles $R_3$ and $R_4$ of the relay 147, pole $R_4$ and contact 149 of the relay 147, conductor 158, relay coil 145 of relay 140, and conductors 159, 156, 120 and 115 to $T_2$. Upon energization of the relay coil 145 the poles $R_1$ and $R_2$ of the relay 140 are moved into engagement with the fixed contacts 143 and 144 as illustrated in Fig. 6. Branch circuit $B_1$ is then energized by a conductor 160 connecting $T_1$ to pole $R_2$ of relay 140 and through fixed contact 144 and conductor 161 to conductor $B_1$. The circuit is completed from the conductor $B_1$ through the motor for the master fuel valve 65 and conductors 128, 120 and 115 to $T_2$, see Fig. 2. Branch circuit $B_2$ is also energized by a jumper 162 connecting the fixed contacts 144 and 143 of relay 140 and through pole $R_1$ to conductor $B_2$. The branch circuit $B_2$ is completed through the valve operating solenoid 67 and conductors 131, 120 and 115 to $T_2$. Upon energization of the branch circuits $B_1$ and $B_2$ the burners 62 and 63 heat the boiler 13 to supply steam to both the refrigeration and heating systems.

After the burners 62 and 63 have operated for a sufficient period of time to generate steam in the boiler 13 and supply it through the conduit 24 to the heating chamber 23 of the generator 15, the thermostat 76 will actuate the contacts 75a and 75b of the delayed action control switch 75. Upon actuation of the contact 75b the circuit for the relay coil 124 is energized to close the relay switch 108 and initiate operation of the cooling tower fan 33, cooling tower pump 34 and condensate return pump 74. Upon actuation of the contact 75a the circuit including the relay coil 121 is completed to close the relay 104 to energize the motor circuit and thereby initiate operation of the blower 8.

When steam is supplied to the generator 15 of the refrigeration system the latter will operate to supply refrigerant to the evaporator 10 which, in turn, evaporates at a low pressure and temperature. As the air to be conditioned is circulated over the evaporator 10 it will be cooled below its dew point and dehumidified. Steam supplied to the radiator 11 will reheat the relatively cold dehumidified air so that it will be delivered to the enclosure 5 at a comfortable temperature.

The air conditioning unit continues to operate to dehumidify and reheat the air until the relative humidity in the enclosure decreases sufficiently to cause the movable contact 136 of the humidistat 135 to move from the fixed contact 137 to the fixed contact 138. Such movement of the movable contact 136 deenergizes the relay coil 145 of the relay 140 and the poles $R_1$ and $R_2$ move from the position shown in Fig. 6 back to the position illustrated in Fig. 2 to deenergize the branch circuits $B_1$ and $B_2$ and thereby discontinue operation of the refrigeration system. A circuit also is completed from conductor C through the conductor 153, contacts 136 and 138 of the humidistat 135, conductor 163 to contact 150, conductor 164 and limit switch 59a to the winding 57a of the reheat motor 56. The circuit for the motor winding 57a is completed through the conductors 156, 120 and 115 to $T_2$. Energization of the winding 57a of the reheat motor 56 causes operation through 180° to release the valve element 43 of the diverter valve 42 for operation by the overcenter spring 51 into engagement with the port 46.

Figure 7:
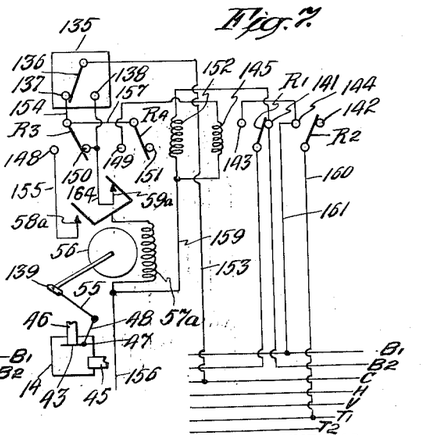
Fig. 7 is a view similar to Fig. 6 showing the relays operated by the energization of the temperature responsive circuit to open the humidity responsive circuit.

If, during operation of the refrigeration system under the control of the humidistat 135 to dehumidify and reheat the air in the enclosure 5, the temperature of the ambient increases sufficiently to cause the room thermostat 93, 94, 95 to energize the branch circuit $B_2$, the relay 147 is operated from the position shown in Fig. 6 to that shown in Fig. 7 to open the humidity responsive circuit. In other words, the temperature responsive circuit overrules the humidity responsive circuit to discontinue reheating of the cooled air when it is desired to reduce its temperature. The circuit for operating the relay 147 comprises the conductors $T_1$, 112 and 113, see Fig. 2, contacts 87 and 89 of thermostatic switch means 86, conductor 130, pole D of selector switch 81, conductor $B_2$ to fixed contact 141 of relay 140, conductor 165 to one side of the relay coil 152. The circuit is completed from the other side of the relay coil 152 through conductors 159, 156, 120 and 115 to T2. Upon energization of the relay coil 152 the poles R3 and R4 of the relay 147 are shifted from engagement with the fixed contacts 148 and 149 into engagement with the contacs 150 and 151, respectively, see Fig. 7. Upon engagement of the pole R3 with the contact 150 a circuit is completed from conductors C and 153, contacts 136 and 137 of humidistat 135, conductor 154, pole R3 and contact 150 of relay 147, conductor 164, limit switch 59a, motor winding 57a and conductors 156, 120 and 115 to T2. The reheat motor 56 then operates to release the crank arm 48 of the diverter valve 42 for actuation by the center spring 51 to close the port 46 leading to the heating radiator 11. Movement of the pole R4 out of engagement with contact 149 opens the circuit to the relay coil 145 of the relay 140 and the poles R1 and R2 shift into engagement with the fixed contacts 141 and 142 as illustrated in Fig. 7. The refrigeration system is then operated under the control of the room thermostat 93, 94, 95 to cool the air in the enclosure 5.

When the air in the enclosure is cooled sufficiently to move the contact 87 of the thermostatically operated switch means 86 out of engagement with the contact 89, see Fig. 2, operation of the refrigeration system to cool the air will be discontinued and the relay coil 152 for the relay 147 will be deenergized. Upon deenergization of the relay coil 152 the poles R3 and R4 of the relay 147 will move back to the position illustrated in Fig. 2. If the humidity in the enclosure 5 has been reduced sufficiently so that the movable contact 136 of the humidistat 135 has moved into engagement with the fixed contact 138, the humidity responsive circuit will be deenergized. If, on the other hand, the contact 136 of the humidistat 135 still engages the contact 137 when the temperature responsive circuit is deenergized the humidity responsive circuit will immediately be energized to continue operation of the refrigeration system and operate the reheat motor 56 to dehumidify and reheat the air in the enclosure 5.

It will now be observed that the present invention provides a humidity responsive control for initiating operation of the refrigeration system to dehumidify the air in an enclosure when the room thermostat is satisfied. It will also be observed that the present invention provides for reheating the air cooled by the refrigeration system during dehumidification to maintain a comfortable temperature in the enclosure. It will still further be observed that the present invention provides an air conditioning unit for cooling the air under the control of a room thermostat and dehumidifying the air under the control of a humidistat and in which the thermostat overrules the humidistat when the temperature increases to discontinue reheating of the air.

While a preferred embodiment of the invention is herein illustrated and described, it is to be understood that modifications may be made in the construction and arrangement of elements and in the control circuits therefor without departing from the spirit of the invention. Therefore, without limiting myself in this respect, reference is to be had to the appended claims for a definition of the limits of the invention.

What is claimed is:

1. In an air conditioning unit, a refrigeration system having a cooling element for cooling and dehumidifying air, means for operating the refrigeration system at different rates of capacity, an electric control circuit having parallel branches, a control element responsive to the temperature of the air to be conditioned for energizing certain of the branches successively as the temperature increases to increase the rate of operation of the refrigeration system with a step by step control, a control element responsive to the humidity of the air to be conditioned for energizing certain branch circuits for initiating operation of the refrigeration system at full capacity, and a relay operative when one of the temperature responsive branches is energized to open the humidity responsive branches.

2. In an air conditioning unit, a heat operated refrigeration system having a cooling element for cooling and dehumidifying air, a heating element for heating said air, a source of heat, selective means for directing heat from said source to the refrigeration system or heating element individually or to both the refrigeration system and heating element simultaneously, control means responsive to the temperature of the air to be conditioned for starting and stopping the supply of heat from said source to control operation of the refrigeration system to cool the air, control means responsive to the humidity of the air to be conditioned for starting and stopping the supply of heat from said source to control operation of the refrigeration system to dehumidify the air by cooling it below its dew point, means operated by the humidity responsive control means for actuating the selective means to supply heat to the refrigeration system and heating element simultaneously to heat the air dehumidified by the cooling element, and means operated by the temperature responsive control means for rendering the humidity responsive control means inoperative whereby to discontinue reheating when cooling is desired.

3. In an air conditioning unit, a heat operated refrigeration system having a cooling element for cooling and dehumidifying air, control means responsive to the dry bulb temperature of the air to be conditioned for starting and stopping the supply of heat to control operation of the refrigeration system to cool the air, control means responsive to the humidity of the air to be conditioned for starting and stopping the supply of heat to control operation of the refrigeration system to dehumidify the air by cooling it below its dew point, a heating element adjacent the cooling element, means operated by the humidity responsive control means for supplying heat from said source to the heating element to heat the air dehumidified by the cooling element, and means operated by the temperature responsive control means for stopping the supply of heat to the heating element whereby to discontinue reheating of the cooled air when its temperature rises above a predetermined value.

4. In an air conditioning unit, a heat operated refrigeration system having a cooling element for cooling and dehumidifying air, control means responsive to the temperature of the air to be conditioned for supplying heat to operate the refrigeration system and cool the air, control means responsive to the humidity of the air to be conditioned for supplying heat to the refrigeration system to dehumidify the air by cooling it below its dew point, a heating element adjacent the cooling element for reheating the air during dehumidification, means operated by the humidity responsive control means for supplying heat to the heating element, and means operated by the temperature responsive control means for stopping the supply of heat to the heating element when the temperature of the air to be conditioned rises sufficiently to cause the temperature responsive control means to operate the refrigeration system to cool the air.

5. In an air conditioning unit, a heat operated refrigeration system having a cooling element for cooling and dehumidifying air to be conditioned, a heating system having a heating element for heating the air to be conditioned, a source of heating medium, control means responsive to the temperature of the air to be conditioned for supplying heating medium from said source to the refrigeration system to cool the air, and control means responsive to the humidity of the air to be conditioned for supplying heating medium from said source to said refrigeration and heating systems simultaneously to dehumidify the air by cooling it below its dew point and reheat the dehumidified air, and means operated by the temperature responsive control means for rendering the humidity responsive means inoperative and thereby discontinue reheating of the air when the refrigeration system operates to cool the air.

6. In an air conditioning unit, a heat operated refrigeration system having a cooling element for cooling and dehumidifying the air to be conditioned, a heating system having a heating element for heating the air to be conditioned, a source of heating medium, a valve for directing heating medium from said source to either the refrigeration system or to the heating system individually or to both systems simultaneously, control means including a thermostat responsive to the temperature of the air to be conditioned for actuating the valve and supplying heating medium from said source to operate the refrigeration system to cool the air, and control means responsive to the humidity of the air to be conditioned for actuating the valve to direct the heating medium from said source to both the refrigeration and heating systems simultaneously whereby to dehumidify the air by cooling it below its dew point and reheat the dehumidified air.

7. In an air conditioning unit, a heat operated refrigeration system having a cooling element for cooling and dehumidifying the air to be conditioned, a heating system having a heating element for heating the air to be conditioned, means for operating the refrigeration system at half and full capacity, an electric control circuit having parallel branches, a control element responsive to the temperature of the air to be conditioned for energizing certain of the branches successively as the temperature increases to operate the refrigeration system with a step control to increase the refrigerating capacity of the cooling element, a control element responsive to the humidity of the air to be conditioned for energizing certain of the branch circuits to operate the refrigeration system at full capacity to dehumidify the air by cooling it below its dew point, means operated by a humidity controlled branch circuit for supplying heat to the heating element to reheat the air during dehumidification, and a relay operative when temperature responsive branch is energized to open the humidity responsive branch circuit and shut off the supply of heat to the heating element.

8. In an air conditioning unit, a heating system having a heating element, a heat operated refrigeration system having a cooling element, means for circulating air to be conditioned over the cooling element and heating element successively, said cooling element operating to dehumidify the air by cooling it below its dew point, a source of heat, means for directing heat from said source to the heating system or heat operated refrigeration system, and means responsive to the humidity of the air to be conditioned for initiating operation of the air circulating means and operating the heat directing means to simultaneously supply heat to both the refrigeration and heating systems whereby to dehumidify and reheat the circulating air.

9. In an air conditioning unit, a heat operated refrigeration system having a cooling element, a heating system having a heating element, means for circulating air to be conditioned over the cooling element and heating element successively, a source of heating medium, a valve, a motor for operating the valve, a control for the motor for operating the valve to select the heat operated refrigeration system or heating system for operation, temperature responsive means for initiating operation of the selected system, a reheat motor for modifying the action of the first mentioned motor for partially opening the valve to supply heating medium simultaneously to the refrigeration and heating systems, and a control responsive to the humidity of the air to be conditioned for initiating operation of the reheat motor to partially open the valve when the humidity is high whereby to dehumidify the air by cooling it below its dew point and reheat the dehumidified air.

10. In a heat operated air conditioning apparatus, a source of heat, heat exchange means, selective control means for adjusting the apparatus for operation by heat from said source to supply either a heating medium or a cooling medium to said heat exchange means, a thermostat for initiating and regulating the operation of said apparatus as adjusted by said selective control means to heat or cool the air, humidity responsive means for initiating operation of said apparatus by heat from said source to simultaneously supply a cooling and heating medium to the heat exchange means to dehumidify the air by cooling it below its dew point and heat the dehumidified air, and means operated by the thermostat upon a rise in temperature for rendering the humidity responsive means inoperative.

11. In an air conditioning unit, a heat operated refrigeration system having a cooling element for cooling and dehumidifying air, a source of heat, means responsive to a temperature condition affected by said cooling element for controlling the supply of heat from said source to operate the refrigeration system, means responsive to change in a humidity condition for controlling the supply of heat from said source to operate the refrigeration system, a heating element, means operated by the humidity responsive means for supplying heat to the heating element to heat the air dehumidified by the cooling element, and means operated by the temperature responsive means for rendering the humidity responsive means inoperative whereby to discontinue heating when cooling is desired.

12. In an air conditioning unit, a heat operated refrigeration system having a cooling element for cooling and dehumidifying air, a heating system having an element for heating air, a source of heat, selective means for directing heat from said source to either the refrigeration system or heating system individually or to both the refrigeration and heating systems simultaneously, a thermostat responsive to a temperature condition affected by said cooling and heating elements and operable independently of the humidity condition for controlling the supply of heat from said source to initiate and regulate operation of the selected system, a humidistat responsive to a change in a humidity condition for actuating the selective means to supply heat from said source to both the refrigeration and heating systems simultaneously to dehumidify and heat the air, and means operated by the thermostat upon an increase in the temperature of the air to a predetermined value for actuating the selective means to stop the supply of heat to the heating system while maintaining the supply of heat to the refrigeration system whereby to discontinue heating when cooling is desired.

13. In an air conditioning unit, a heat operated refrigeration system having a cooling element, a heating system having a heating element, a source of heat, a valve, an actuating device for moving the valve to one or the other of two positions to direct heat from said source to either the heating system or refrigeration system, respectively, and a second actuating device for moving the valve between the two positions to supply heat from said source to both the heating and refrigeration systems simultaneously, means responsive to change in a humidity condition for controlling the second valve actuating device, and yielding connections between the actuating devices and valve for permitting relative movement.

14. In an air conditioning unit, a heat operated refrigeration system having a cooling element, a heating system having a heating element, a source of heat, a valve chamber connected to said source of heat and having a port connected to the refrigeration system and a port connected to the heating system, a movable valve element for closing one port and opening the other port, selective means including an actuating device for moving the valve element from one to the other of its two positions, humidity responsive means including a second actuating device for moving the valve element to a position between the two ports to supply heat from said source to both the heating and refrigeration systems simultaneously, and yielding connections between the actuating devices and valve element for permitting relative movement.

15. In an air conditioning unit, a heat operated refrigeration system having a cooling element, a heating system having a heating element, a source of heat, a valve chamber connected to said source of heat and having a port connected to said refrigeration system and a port connected to said heating system, a pivotally mounted valve element for closing one and opening the other of said ports, respectively, a crank arm for actuating the valve element, resilient means for yieldingly holding the valve element in engagement with each of the valve ports, control means including an actuating device connected to the crank arm for moving the valve to one or the other of its two positions to direct heat from said source to either the heating system or refrigeration system, respectively, humidity responsive control means including a second actuating device for moving the valve element to a position between the outlet ports to supply heat from said source to both the heating and refrigeration systems simultaneously, and yielding connections between the actuating devices and valve crank arm for permitting relative movement.

SVEN W. E. ANDERSSON.

REFERENCES CITED

The following references are of record in the file of this patent:

UNITED STATES PATENTS

| Number | Name | Date |
|---|---|---|
| 2,111,618 | Erbach | Mar. 22, 1938 |
| 2,112,038 | McLenegan | Mar. 22, 1938 |
| 2,185,198 | Huggins | Jan. 2, 1940 |
| 2,257,540 | Smellie | Sept. 30, 1941 |
| 2,381,427 | Andersson | Aug. 7, 1945 |